(12) United States Patent
Hu et al.

(10) Patent No.: US 10,349,353 B2
(45) Date of Patent: Jul. 9, 2019

(54) AUTOMATIC UPLOADING METHOD AND PORTABLE INFORMATION CAPTURING DEVICE CAPABLE OF AUTOMATIC UPLOADING

(71) Applicant: GETAC TECHNOLOGY CORPORATION, Hsinchu County (TW)

(72) Inventors: Chien-Chih Hu, Taipei (TW); Chia-Chuan Wu, Taipei (TW); Chen-Shu Tsai, Taipei (TW); Ta-Wei Chang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 63 days.

(21) Appl. No.: 15/456,380

(22) Filed: Mar. 10, 2017

(65) Prior Publication Data
US 2018/0049127 A1    Feb. 15, 2018

Related U.S. Application Data

(60) Provisional application No. 62/373,917, filed on Aug. 11, 2016.

(51) Int. Cl.
*H04W 52/02* (2009.01)
*H04W 40/22* (2009.01)
(Continued)

(52) U.S. Cl.
CPC ......... *H04W 52/0229* (2013.01); *H04W 4/06* (2013.01); *H04W 4/80* (2018.02); *H04W 40/22* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 2005/0099943 A1* | 5/2005 | Naghian | H04W 72/00 370/229 |
| 2006/0094478 A1* | 5/2006 | Kim | H04W 52/0235 455/574 |

(Continued)

OTHER PUBLICATIONS

JJ, How to Automatically Turn Off the WiFi When it is not in Use (and Save Battery Life) [Android], 2012 (Year: 2012).*

*Primary Examiner* — Jeffrey M Rutkowski
*Assistant Examiner* — Andre Tacdiran

(57) ABSTRACT

An automatic uploading method, comprising the steps of: receiving a wake-up signal by a low-power-consumption wireless transmission module of a portable information capturing device; actuating a high-power-consumption wireless transmission module of the portable information capturing device according to the wake-up signal; creating a connection between the high-power-consumption wireless transmission module and a first relay station after the high-power-consumption wireless transmission module has been actuated; shutting down the low-power-consumption wireless transmission module after the connection has been created; and transmitting, via the connection, an upload data of the portable information capturing device to a second relay station, wherein the second relay station is connected to the first relay station.

17 Claims, 5 Drawing Sheets

(51) Int. Cl.
  *H04W 76/10* (2018.01)
  *H04W 4/80* (2018.01)
  *H04W 4/06* (2009.01)

(56) References Cited

U.S. PATENT DOCUMENTS

| | | | | |
|---|---|---|---|---|
| 2009/0129306 | A1* | 5/2009 | Twitchell, Jr. | H04W 52/0235 370/311 |
| 2009/0196212 | A1* | 8/2009 | Wentink | H04W 52/0235 370/311 |
| 2011/0076984 | A1* | 3/2011 | Flippo | G01S 19/17 455/404.2 |
| 2011/0256826 | A1* | 10/2011 | Ode | H04B 7/15535 455/7 |
| 2011/0299512 | A1* | 12/2011 | Fukuda | G06F 1/163 370/338 |
| 2012/0250731 | A1* | 10/2012 | Taghavi Nasrabadi | H04W 88/06 375/147 |
| 2014/0312127 | A1* | 10/2014 | Rylski | G05D 23/1905 236/51 |
| 2015/0195694 | A1* | 7/2015 | Vedhanarayanan | H04W 4/90 455/404.1 |
| 2015/0237658 | A1* | 8/2015 | Fontaine | H04W 76/10 370/311 |
| 2016/0057605 | A1* | 2/2016 | Shellhammer | H04W 8/005 370/311 |
| 2016/0057703 | A1* | 2/2016 | Benoit | H04W 8/005 370/311 |
| 2016/0081134 | A1* | 3/2016 | Chow | G06Q 30/0263 455/419 |
| 2016/0198410 | A1* | 7/2016 | Cherniavsky | H04W 52/0229 370/278 |
| 2016/0381638 | A1* | 12/2016 | Min | H04W 52/0235 370/311 |
| 2017/0280498 | A1* | 9/2017 | Min | H04L 5/0053 |
| 2018/0092034 | A1* | 3/2018 | Huang | H04W 52/0229 |

\* cited by examiner

AUTOMATIC UPLOADING METHOD AND PORTABLE INFORMATION CAPTURING DEVICE CAPABLE OF AUTOMATIC UPLOADING

BACKGROUND OF THE INVENTION

Field of the Invention

The present invention relates to portable information capturing devices and, more particularly, to an automatic uploading method and a portable information capturing device capable of automatic uploading.

Description of the Prior Art

Due to enhanced security awareness among the general public, portable information capturing devices are used as security auxiliary devices and widely applied to various fields because they are convenient to carry and capable of capturing real-time data.

Conventional portable information capturing devices capture data pertaining to images, sounds, and the like and store the captured data in their memory space, such as memory cards. However, the memory space of conventional portable information capturing devices is not unlimited, and data stored therein may get lost because of the inadequacy of the memory space. As a result, after capturing data with conventional portable information capturing devices for a specific period of time, users have to manually output or transfer the data stored in the memory space, for example, remove memory cards from the conventional portable information capturing devices and then insert the memory cards into related slots of computers to transfer data.

The aforesaid manual data transfer process is intricate and takes much time, thereby being inefficient.

SUMMARY OF THE INVENTION

In an embodiment, an automatic uploading method comprises the steps of: receiving a wake-up signal by a low-power-consumption wireless transmission module of a portable information capturing device; actuating a high-power-consumption wireless transmission module of the portable information capturing device according to the wake-up signal; creating a connection between the high-power-consumption wireless transmission module and a first relay station after the high-power-consumption wireless transmission module has been actuated; shutting down the low-power-consumption wireless transmission module after the connection has been created; and transmitting, via the connection, an upload data of the portable information capturing device to a second relay station, wherein the second relay station is connected to the first relay station.

In an embodiment, a portable information capturing device capable of automatic uploading comprises an information capturing module, a low-power-consumption wireless transmission module, a high-power-consumption wireless transmission module and a processing module. The information capturing module captures an upload data. The low-power-consumption wireless transmission module receives the wake-up signal. The high-power-consumption wireless transmission module creates a connection to a first relay station. The processing module actuates the high-power-consumption wireless transmission module as soon as the low-power-consumption wireless transmission module receives the wake-up signal, and shuts down the low-power-consumption wireless transmission module as soon as the connection is created. The processing module transmits the upload data to a second relay station via the connection. The second relay station is connected to the first relay station.

In conclusion, in embodiments of the present invention, an automatic uploading method and a portable information capturing device capable of automatic uploading are characterized in that a high-power-consumption wireless transmission module is actuated to create a connection, according to whether a low-power-consumption wireless transmission module has detected a wake-up signal sent from a first relay station or according to whether the portable information capturing device has been connected to a charger, so that the portable information capturing device effectuates transmission of upload data automatically via a connection created by the high-power-consumption wireless transmission module, thereby dispensing users with the need to carry out complicated operation procedure manually. Furthermore, since the automatic uploading method and the portable information capturing device capable of automatic uploading effectuate transmission of upload data automatically, the users need not wait for the transmission of upload data, thereby enhancing transfer efficiency. Moreover, since the high-power-consumption wireless transmission module is usually in a shutdown state and will be actuated only if transmission of upload data is required, thereby reducing overall power consumption.

Fine features and advantages of the present invention are described below to enable persons skilled in the art to gain insight into the technical solution disclosed in the present invention and thus implement the present invention. Furthermore, persons skilled in the art can easily understand related objectives and advantages of the present invention by referring to the disclosure contained herein, the claims, and the accompanying drawings.

DETAILED DESCRIPTION OF THE EMBODIMENTS

Figure 1:
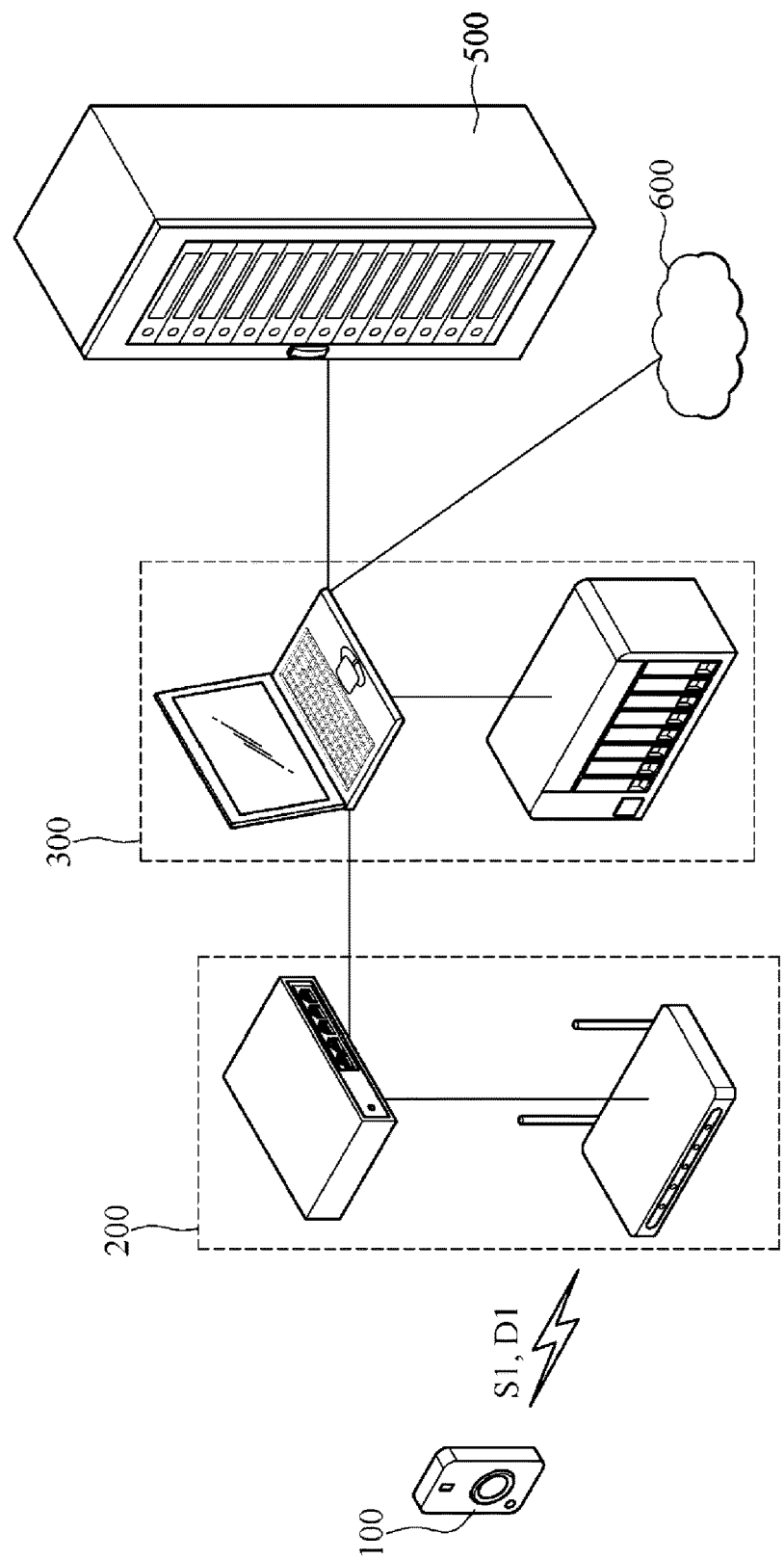
FIG. 1 is a schematic view of a transmission system according to the first embodiment of the present invention.

FIG. 1 is a schematic view of a transmission system according to the first embodiment of the present invention. Referring to FIG. 1, a portable information capturing device 100 capable of automatic uploading generates an upload data D1, creates automatically, according to an automatic uploading method of any embodiment of the portable information capturing device 100, a connection to a first relay station 200 which falls within the radio frequency (RF) signal coverage of the portable information capturing device 100, and transmits the upload data D1 to a second relay station 300 through the first relay station 200. Therefore, the transmission system comprises the portable information capturing device 100, the first relay station 200, and the second relay station 300. Once the connection is created, the first relay station 200 will be connected between the portable information capturing device 100 and the second relay station 300.

Although only one portable information capturing device 100 is shown in FIG. 1, its quantity is not restricted by FIG. 1. Therefore, when the first relay station 200 falls within the RF signal coverage of multiple portable information capturing devices 100, the portable information capturing devices 100 create connections to the first relay station 200 simultaneously and automatically to upload the upload data D1 to the same second relay station 300 or different second relay stations 300 through the first relay station 200.

Although only one first relay station 200 is shown in FIG. 1, its quantity is not restricted by FIG. 1. Therefore, when multiple first relay stations 200 fall within the RF signal coverage of the portable information capturing devices 100, the portable information capturing devices 100 automatically create connections to the first relay stations 200 which fall within the RF signal coverage of the portable information capturing devices 100. However, at this point in time, the portable information capturing devices 100 actually create connections to just one of the first relay stations 200.

In some embodiments, the portable information capturing devices 100 are multimedia capturing devices, such as body-worn cameras, walkmans, recorder pens, and event data recorders. The first relay station 200 comprises one or more network devices. The network devices are each an RF access point (AP), such as an RF router, a switch, or a combination thereof. The second relay station 300 comprises one or more hosts. Each host is a computer, server, gateway, or network attached storage (NAS). Furthermore, a connection between the first relay station 200 and the second relay station 300 is created by RF communication, cable communication, or a combination thereof, but the present invention is not limited thereto.

Figure 2:
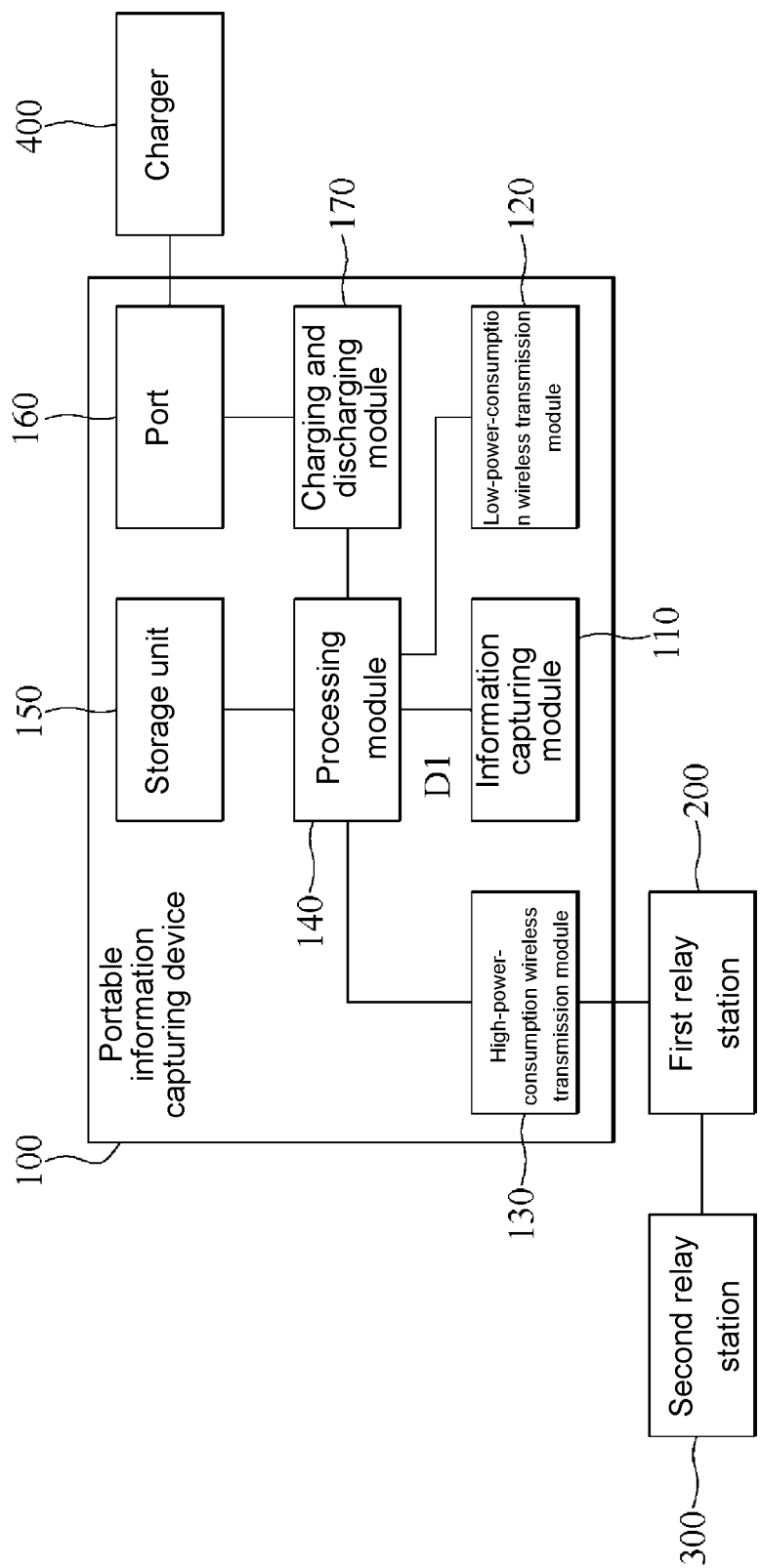
FIG. 2 is a block diagram of a portable information capturing device capable of automatic uploading according to the first embodiment of the present invention.

FIG. 2 is a block diagram of a portable information capturing device capable of automatic uploading according to the first embodiment of the present invention. Referring to FIG. 1 and FIG. 2, the portable information capturing devices 100 comprises an information capturing module 110, a low-power-consumption wireless transmission module 120, a high-power-consumption wireless transmission module 130, and a processing module 140. The processing module 140 is coupled to the information capturing module 110, the low-power-consumption wireless transmission module 120, and the high-power-consumption wireless transmission module 130.

In some embodiments, the processing module 140 comes in the form of one or more processing components. The processing components are each an SoC (System on a Chip), a CPU (central processing unit), or an MCU (microcontroller), but the present invention is not limited thereto.

The information capturing module 110 generates the upload data D1. In some embodiments, the information capturing module 110 captures information pertaining to the surroundings of the portable information capturing devices 100 in order to generate the upload data D1 corresponding to the captured information. In some embodiments, the upload data D1 is multimedia data descriptive of images and/or sounds. Furthermore, the information capturing module 110 is audiovisual input equipment, such as a camera lens and/or a microphone, but the present invention is not limited thereto.

In an embodiment, the portable information capturing devices 100 further comprises a storage unit 150. The storage unit 150 is coupled to the processing module 140. The storage unit 150 stores the upload data D1 generated by the information capturing module 110.

In some embodiments, the storage unit 150 is provided in the form of one or more storage components. The storage components are non-volatile memory (such as ROM and flash memory) or volatile memory (such as RAM).

Figure 3:
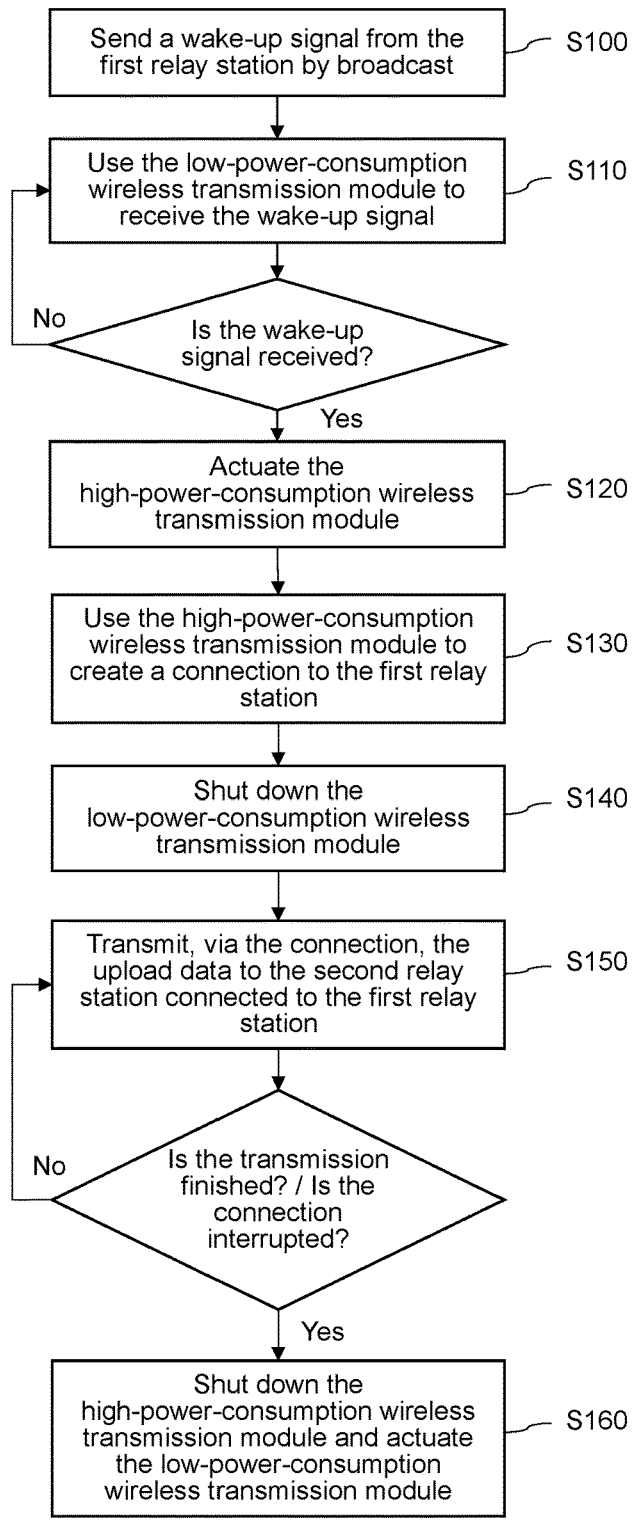
FIG. 3 is a flow chart of an automatic uploading method according to the first embodiment of the present invention.

FIG. 3 is a flow chart of an automatic uploading method according to the first embodiment of the present invention. Referring to FIG. 1 through FIG. 3, in this embodiment, normally, no communication connection is created between the first relay station 200 and the portable information capturing devices 100. Furthermore, the first relay station 200 sends a wake-up signal S1 by broadcast (step S100). The wake-up signal S1 actuates the high-power-consumption wireless transmission module 130 which is otherwise in a shutdown state so that the portable information capturing devices 100 uploads the upload data D1 through the high-power-consumption wireless transmission module 130. If the RF signal coverage of the low-power-consumption wireless transmission module 120 and the broadcast range of the first relay station 200 (i.e., the portable information capturing devices 100 fall within the broadcast range of the first relay station 200) overlap, the portable information capturing devices 100 will use the low-power-consumption wireless transmission module 120 to receive the wake-up signal S1 (step S110) and thereby allow the high-power-consumption wireless transmission module 130 to create a communication connection to the first relay station 200. The wake-up signal S1 is an RF signal. Normally, the low-power-consumption wireless transmission module 120 of the portable information capturing devices 100 is in an enabled state and scans (detects) repeatedly for RF signals within the RF signal coverage of the low-power-consumption wireless transmission module 120.

After the low-power-consumption wireless transmission module 120 has received the wake-up signal S1, the processing module 140 actuates the high-power-consumption wireless transmission module 130 according to the wake-up signal S1 (step S120). After the high-power-consumption wireless transmission module 130 has started, the portable information capturing device 100 uses the high-power-consumption wireless transmission module 130 to create a connection to the first relay station 200 (step S130). After the connection has been created, the processing module 140 shuts down the low-power-consumption wireless transmission module 110 (step S140) and then transmits, via the connection, the upload data D1 to the second relay station 300 connected to the first relay station 200 (step S150). Therefore, with the high-power-consumption wireless transmission module 130, it is feasible for the processing module 140 to upload the upload data D1 to the second relay station 300 through the first relay station 200.

In an embodiment of step S110, the portable information capturing device 100 performs detection continuously through the low-power-consumption wireless transmission module 120, so as to receive the wake-up signal S1, thereby allowing the processing module 140 to actuate the high-power-consumption wireless transmission module 130 to begin operating. However, the present invention is not limited thereto, as, in another embodiment of step S110, the portable information capturing devices 100 performs detection discontinuously through the low-power-consumption wireless transmission module 120 (by alternating between a detection session and a pause session until the wake-up signal S1 is received), thereby allowing the processing module 140 to actuate the high-power-consumption wireless transmission module 130 to begin operating.

In some embodiments, the low-power-consumption wireless transmission module 120 is configured for Bluetooth, such as Classic Bluetooth, Bluetooth High Speed, and Bluetooth Low Energy (BLE), to effectuate Bluetooth-enabled data transmission. Furthermore, the high-power-consumption wireless transmission module 130 is a Wi-Fi-enabled transmission module, but the present invention is not limited thereto.

Although in this embodiment the low-power-consumption wireless transmission module 120 receives the wake-up signal S1, the present invention is not limited to this function, because the low-power-consumption wireless transmission module 120 operates in a way as needed. The portable information capturing devices 100 use the low-power-consumption wireless transmission module 120 to perform wireless transmission of data with the other devices.

In an embodiment of step S130, the high-power-consumption wireless transmission module 130 creates a security connection to the first relay station 200 by a security protection mechanism, such as RSA encryption algorithm.

In an embodiment of step S140, after confirming that it has created a connection to the first relay station 200, the portable information capturing device 100 disables the operation of the low-power-consumption wireless transmission module 120 to reduce power consumption and prevent the low-power-consumption wireless transmission module 120 from receiving the wake-up signal S1 from another first relay station again.

In an embodiment of step S150, the wake-up signal S1 includes a service identifier (such as Service Set Identifier, SSID) of the second relay station 300 connected to the first relay station 200, and the high-power-consumption wireless transmission module 130 creates a connection to the second relay station 300 according to the service identifier attributed to the second relay station 300 and described in the wake-up signal S1, so as for the portable information capturing device 100 to transmit the upload data D1 to the second relay station 300.

In an embodiment, after step S150, the processing module 140 of the portable information capturing device 100 further detects whether the high-power-consumption wireless transmission module 130 has transmitted to the second relay station 300 the upload data D1 otherwise stored in the storage unit 150. After determining that the upload data D1 has been transmitted, the processing module 140 shuts down the high-power-consumption wireless transmission module 130 and actuates the low-power-consumption wireless transmission module 120 (step S160), so as to prevent the high-power-consumption wireless transmission module 130 from operating too long and thus reduce the overall power consumption of the portable information capturing device 100. However, the present invention is not limited thereto, as, in another embodiment, after step S150, the processing module 140 of the portable information capturing device 100 determines whether to execute step S160, according to whether the connection has been interrupted. For example, if a user moves and thereby distances himself or herself from the first relay station 200, the portable information capturing device 100 may have the connection interrupted in order for step S160 to be executed, allowing the portable information capturing device 100 to use the low-power-consumption wireless transmission module 120 to detect for the wake-up signal S1 anew.

Figure 4:
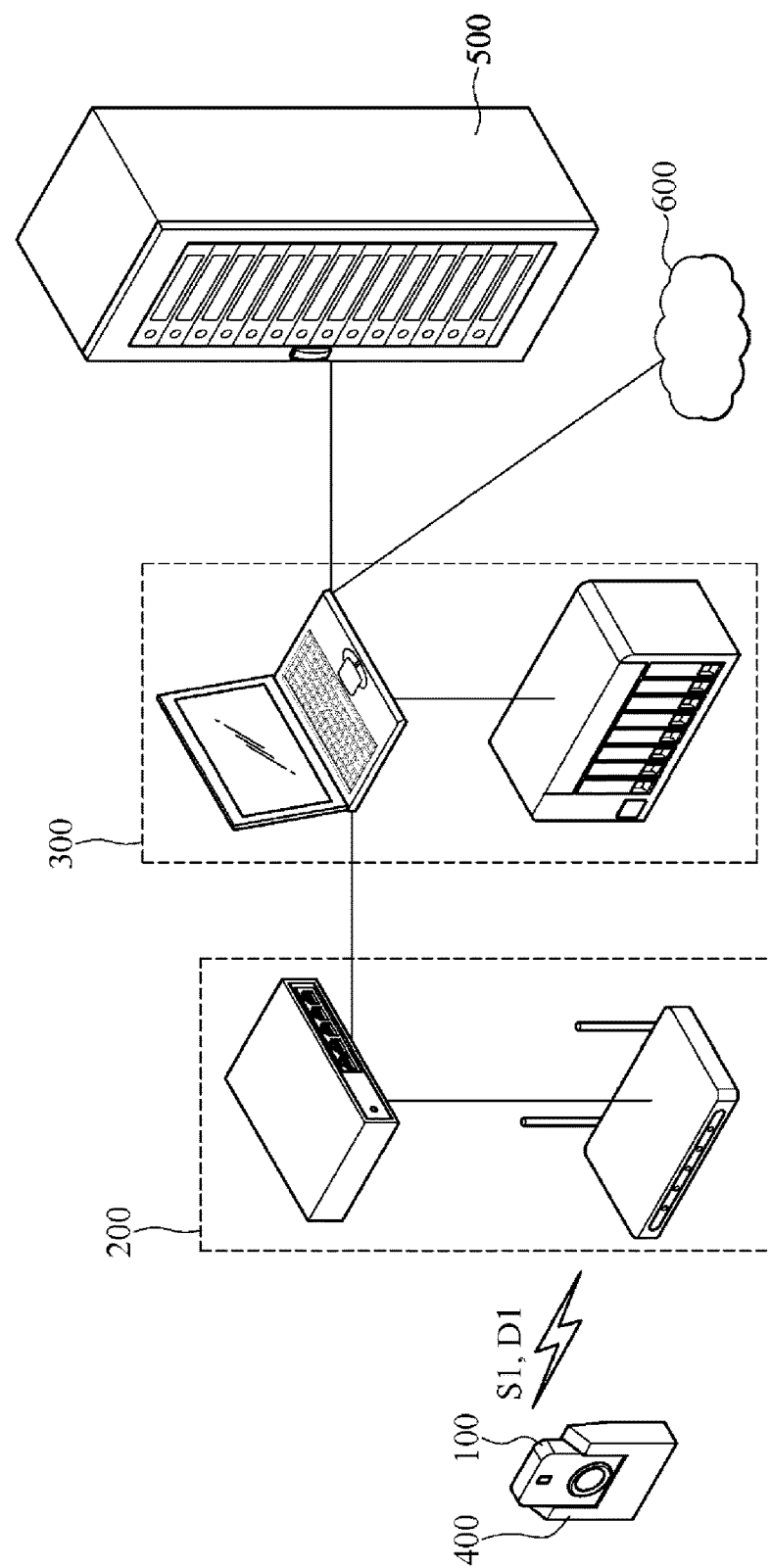
FIG. 4 is a schematic view of the transmission system according to the second embodiment of the present invention.

FIG. 4 is a schematic view of the transmission system according to the second embodiment of the present invention. Referring to FIG. 2 and FIG. 4, in an embodiment, the portable information capturing device 100 further comprises a port 160 and a charging and discharging module 170. The charging and discharging module 170 is coupled to the port 160 and the processing module 140. The port 160 is adapted to connect with a charger 400 so that a charging process can be performed with the charger 400. Furthermore, the charging and discharging module 170 stores the power received through the port 160, and the stored power is eventually supplied to the portable information capturing device 100 for performing related operations.

Figure 5:
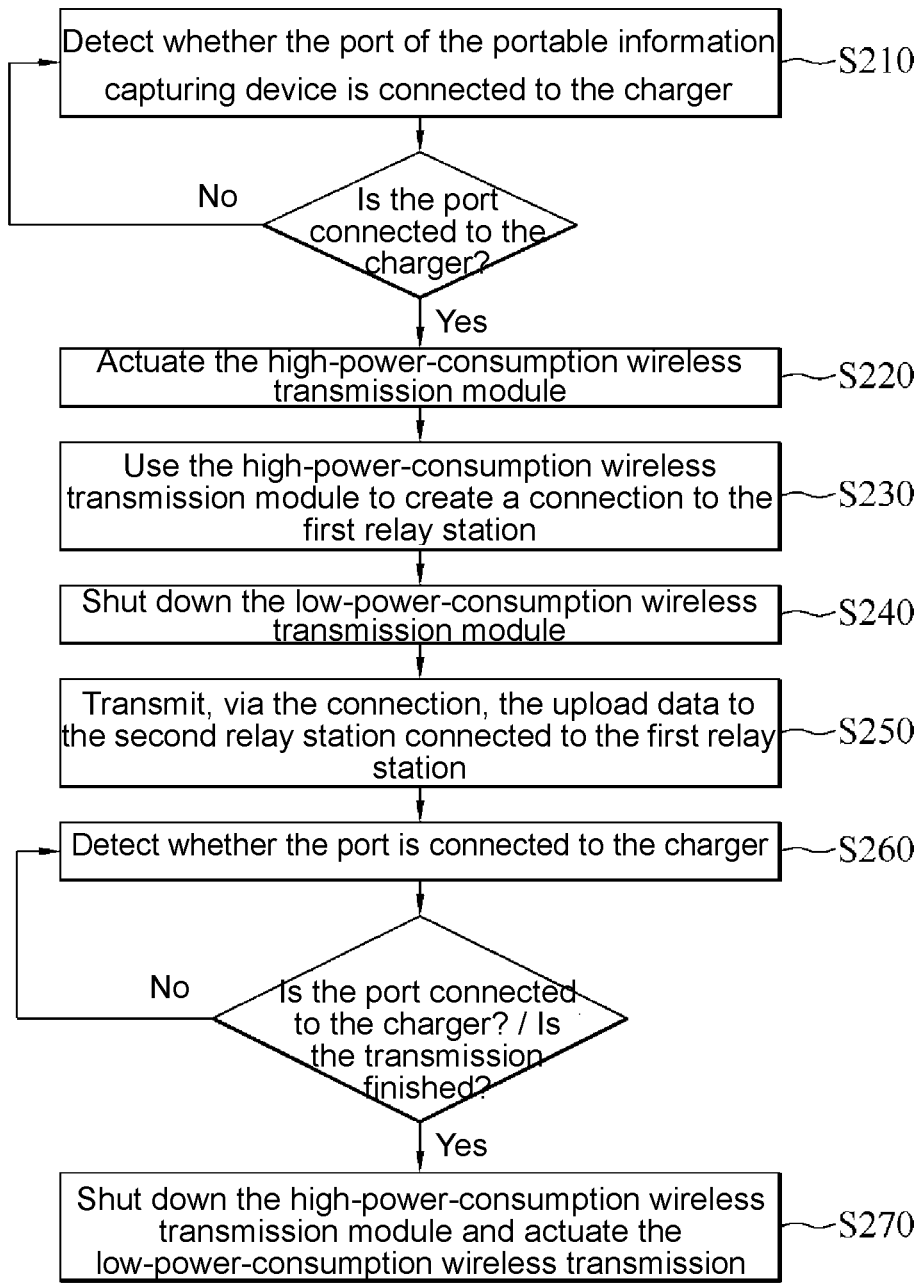
FIG. 5 is a flow chart of the automatic uploading method according to the second embodiment of the present invention.

FIG. 5 is a flow chart of the automatic uploading method according to the second embodiment of the present invention. Referring to FIG. 1 through FIG. 5, in the second embodiment of the automatic uploading method, before detecting whether the port 160 is connected to the charger 400 (step S210) and determining that the port 160 is connected to the charger 400, the processing module 140 actuates the high-power-consumption wireless transmission module 130 (step S220) before the low-power-consumption wireless transmission module 120 receives the wake-up signal S1. After the high-power-consumption wireless transmission module 130 has started, the portable information capturing device 100 uses the high-power-consumption wireless transmission module 130 to create a connection to the first relay station 200 (step S230). After the connection between the high-power-consumption wireless transmission module 130 and the first relay station 200 has been created, the processing module 140 shuts down the low-power-consumption wireless transmission module 120 (step S240) and transmits, via the connection, the upload data D1 to the second relay station 300 connected to the first relay station 200 (step S250), thereby effectuating the transmission of the upload data D1 automatically.

In an embodiment of step S210, the processing module 140 determines whether the port 160 has separated from the charger 400, according to whether the charging and discharging module 170 performs a charging process through the port 160.

Step S220, step S230, and step S240 are substantially the same as step S120, step 130, and step S140, respectively, and thus are not described herein for the sake of brevity.

In an embodiment of step S250, the high-power-consumption wireless transmission module 130 creates a connection to the first relay station 200 to obtain the service identifier of the second relay station 300, and then the high-power-consumption wireless transmission module 130 creates a connection to the second relay station 300 according to the obtained service identifier, thereby allowing the second relay station 300 to take the upload data D1 of the portable information capturing device 100 to its access space via the connection.

In an embodiment, after step S250, the processing module 140 of the portable information capturing device 100 detects whether the port 160 has been connected to the charger 400 (step S260). If the processing module 140 does not detect that the port 160 has been connected to the charger 400, the processing module 140 actuates the low-power-consumption wireless transmission module 120 again and shuts down the high-power-consumption wireless transmission module 130 (step S270), so as to prevent the high-power-consumption wireless transmission module 130 from operating too long and thus reduce the overall power consumption of the portable information capturing device 100. However, the present invention is not limited thereto, as, in another embodiment, after step S250, the processing module 140 of the portable information capturing device 100 determines whether to execute step S270, according to whether the upload data D1 stored in the storage unit 150 has been transmitted to the second relay station 300. For example, after determining that the transmission of the upload data D1 has been finished, the processing module 140 of the portable information capturing device 100 executes step S270 to actuate the low-power-consumption wireless transmission module 120 again and shut down the high-power-consumption wireless transmission module 130.

In some embodiments, the second relay station 300 transfers collected multiple upload data D1 to a server 500 or cloud 600 dedicated to data storage, through an RF network and/or a cable network, regularly to effectuate an update.

In conclusion, in embodiments of the present invention, an automatic uploading method and a portable information capturing device capable of automatic uploading are characterized in that a high-power-consumption wireless transmission module is actuated to create a connection, according to whether a low-power-consumption wireless transmission module has detected a wake-up signal sent from a first relay station or according to whether the portable information capturing device has been connected to a charger, so that the portable information capturing device effectuates transmission of upload data automatically via a connection created by the high-power-consumption wireless transmission module, thereby dispensing users with the need to carry out complicated operation procedure manually. Furthermore, since the automatic uploading method and the portable information capturing device capable of automatic uploading effectuate transmission of upload data automatically, the users need not wait for the transmission of upload data, thereby enhancing transfer efficiency. Moreover, since the high-power-consumption wireless transmission module is usually in a shutdown state and will be actuated only if transmission of upload data is required, thereby reducing overall power consumption.

Although the present invention is disclosed above by preferred embodiments, the preferred embodiments are not restrictive of the present invention. Any persons skilled in the art can make some changes and modifications to the preferred embodiments without departing from the spirit of the present invention. Accordingly, the legal protection for the present invention should be defined by the appended claims.

What is claimed is:

1. An automatic uploading method, comprising the steps of:
   receiving a wake-up signal by a low-power-consumption wireless radio transmission module of a portable information capturing device;
   actuating a high-power-consumption wireless radio transmission module of the portable information capturing device according to the wake-up signal;
   creating a first connection between the high-power-consumption wireless radio transmission module and a first relay station after the high-power-consumption wireless radio transmission module has been actuated;
   shutting down the low-power-consumption wireless radio transmission module after the first connection has been created; and
   transmitting, via the first connection, an upload data of the portable information capturing device to a second relay station,
   wherein the second relay station is connected to the first relay station;
   wherein, before the step of receiving the wake-up signal, the automatic uploading method further comprises:
      detecting whether a port of the portable information capturing device is connected to a charger;
      actuating the high-power-consumption wireless radio transmission module in response to detection that the port is connected to the charger;
      using the high-power-consumption wireless radio transmission module to establish a second connection to the first relay station;
      shutting down the low-power-consumption wireless radio transmission module upon establishing the second connection of the high-power-consumption wireless radio transmission module to the first relay station; and
   wherein, after the step of actuating the high-power-consumption wireless radio transmission module and in response to detection that the port is connected to the charger, the automatic uploading method further comprises:
      detecting whether the port remains connected to the charger; and
      actuating the low-power-consumption wireless radio transmission module and shutting down the high-power-consumption wireless radio transmission module in response to detection that the port is no longer connected to the charger.

2. The automatic uploading method of claim 1, further comprising,
   after the step of transmitting the upload data of the portable information capturing device, shutting down the high-power-consumption wireless radio transmission module and actuating the low-power-consumption wireless radio transmission module.

3. The automatic uploading method of claim 1, further comprising:
   sending the wake-up signal from the first relay station by broadcast.

4. The automatic uploading method of claim 1,
   wherein the low-power-consumption wireless radio transmission module is a Bluetooth-enabled transmission module, and
   the high-power-consumption wireless radio transmission module is a Wi-Fi-enabled transmission module.

5. The automatic uploading method of claim 1,
   wherein the high-power-consumption wireless radio transmission module creates at least one connection to the first relay station by a security protection mechanism.

6. The automatic uploading method of claim 1,
   wherein the low-power-consumption wireless radio transmission module and the high-power-consumption wireless radio transmission module use different communication protocols.

7. A portable information capturing device capable of automatic uploading, comprising:
   an information capturing module for generating an upload data;
   a low-power-consumption wireless radio transmission module for receiving a wake-up signal;
   a high-power-consumption wireless radio transmission module for creating a connection to a first relay station;
   a port for connecting to a charger; and
   a processing module configured to perform the operations of:
      performing a first method of connection, the first method comprising:

actuating the high-power-consumption wireless radio transmission module upon the low-power-consumption wireless radio transmission module receiving the wake-up signal, establishing a connection with the first relay station with the actuated high-power-consumption wireless radio transmission module, transmitting the upload data via the connection, and shutting down the low-power-consumption wireless radio transmission module in response to the connection being established;

performing a second method of connection, the second method comprising:

upon connection of the port to the charger:

actuating the high-power-consumption wireless radio transmission module, connecting to the first relay station using the high-power-consumption wireless radio transmission module, and shutting down the low-power-consumption wireless radio transmission module upon connection of the high-power-consumption wireless radio transmission module to the first relay station; and upon separation of the port from the charger:

actuating the low-power-consumption wireless radio transmission module and shutting down the high-power-consumption wireless radio transmission module;

wherein the second relay station is connected to the first relay station.

8. The portable information capturing device capable of automatic uploading according to claim 7, wherein, upon completion of transmission of the upload data, the processing module shuts down the high-power-consumption wireless radio transmission module and actuates the low-power-consumption wireless radio transmission module.

9. The portable information capturing device capable of automatic uploading according to claim 7, wherein the wake-up signal is sent from the first relay station by broadcast.

10. The portable information capturing device capable of automatic uploading according to claim 7, wherein the low-power-consumption wireless radio transmission module is a Bluetooth-enabled transmission module, and the high-power-consumption wireless radio transmission module is a Wi-Fi-enabled transmission module.

11. The portable information capturing device capable of automatic uploading according to claim 7, wherein the high-power-consumption wireless radio transmission module creates the connection to the first relay station by a security protection mechanism.

12. The portable information capturing device capable of automatic uploading of claim 7, wherein the low-power-consumption wireless radio transmission module and the high-power-consumption wireless radio transmission module use different communication protocols.

13. A portable information capturing device capable of automatic uploading, comprising:

an information capturing module for generating an upload data;

a low-power-consumption wireless radio transmission module;

a high-power-consumption wireless radio transmission module;

a port for connecting to a charger; and a processing module configured to perform the operations of:

performing a first method of connection, the first method comprising:

in response to receiving a wake-up signal at the low-power-consumption wireless radio transmission module, wherein the wake-up signal comprises a service identifier:

actuating the high-power-consumption wireless radio transmission module;

establishing a first connection to the second relay station according to the service identifier of using the high-power-consumption wireless radio transmission module;

transmitting the upload data via the first connection; and shutting down the low-power-consumption wireless radio transmission module in response to the establishing the first connection; and performing a second method of connection, the second method comprising:

in response to detecting the port being connected to the charger:

actuating the high-power-consumption wireless radio transmission module;

establishing a second connection to the first relay station using the high-power-consumption wireless radio transmission module; and shutting down the low-power-consumption wireless radio transmission module in response to the high-power-consumption wireless radio transmission establishing the second connection to the first relay station; and in response to detecting the port being disconnected to the charger:

actuating the low-power-consumption wireless radio transmission module and shutting down the high-power-consumption wireless radio transmission module.

14. The portable information capturing device capable of automatic uploading according to claim 13, wherein the wake-up signal is sent from the first relay station by broadcast.

15. The portable information capturing device capable of automatic uploading according to claim 13, wherein the low-power-consumption wireless radio transmission module is a Bluetooth-enabled transmission module, and the high-power-consumption wireless radio transmission module is a Wi-Fi-enabled transmission module.

16. The portable information capturing device capable of automatic uploading according to claim 13, wherein the high-power-consumption wireless radio transmission module creates the connection to the first relay station by a security protection mechanism.

17. The portable information capturing device capable of automatic uploading of claim 13, wherein the low-power-consumption wireless radio transmission module and the high-power-consumption wireless radio transmission module use different communication protocols.

* * * * *